United States Patent
Zamberger

(10) Patent No.: US 11,536,342 B2
(45) Date of Patent: Dec. 27, 2022

(54) SPRING LEAF AND METHOD FOR PRODUCING A SPRING LEAF

(71) Applicant: Hendrickson Commercial Vehicle Systems Europe GmbH, Judenburg (AT)

(72) Inventor: Joerg Zamberger, Fohnsdorf (AT)

(73) Assignee: Hendrickson Commercial Vehicle Systems Europe GmbH, Judenburg (AT)

( * ) Notice: Subject to any disclaimer, the term of this patent is extended or adjusted under 35 U.S.C. 154(b) by 110 days.

(21) Appl. No.: 16/622,232

(22) PCT Filed: Oct. 16, 2018

(86) PCT No.: PCT/EP2018/078224
§ 371 (c)(1),
(2) Date: Dec. 12, 2019

(87) PCT Pub. No.: WO2019/076887
PCT Pub. Date: Apr. 25, 2019

(65) Prior Publication Data
US 2021/0054895 A1    Feb. 25, 2021

(30) Foreign Application Priority Data
Oct. 16, 2017   (AT) ................ A 50876/2017

(51) Int. Cl.
*F16F 1/18* (2006.01)
*B21B 1/46* (2006.01)
(Continued)

(52) U.S. Cl.
CPC .............. *F16F 1/185* (2013.01); *B21B 1/463* (2013.01); *B24C 1/10* (2013.01); *B60G 11/02* (2013.01);
(Continued)

(58) Field of Classification Search
CPC .......... F16F 1/185; B60G 11/02; B60G 11/04; B60G 11/12; B60G 11/107;
(Continued)

(56) References Cited

U.S. PATENT DOCUMENTS 3,238,072 A * 3/1966 Greene ............... B21D 53/886
148/580
3,339,908 A * 9/1967 Komarnitsky ........... F16F 1/02
267/47
(Continued)

FOREIGN PATENT DOCUMENTS

CA    2514856 A1    2/2006
DE    1427382 A1    10/1968
(Continued)

OTHER PUBLICATIONS

English Translation of Office Action Issued From The China National Intellectual Property Administration for Chinese Application No. 201880039919.8, dated Oct. 12, 2020 (7 pages).
(Continued)

*Primary Examiner* — Robert A. Siconolfi
*Assistant Examiner* — San M Aung
(74) *Attorney, Agent, or Firm* — Cook Alex Ltd.

(57) ABSTRACT

In a method for producing a spring leaf (2) for a leaf spring, in particular a parabolic spring or suspension spring, wherein the spring leaf (2) comprises two end regions, a central region, a top side which is subjected to tensile stress in the operative state, and a bottom side (1) which is subjected to pressure in the operative state, at least one hole (3) is introduced into the bottom side (1). The bottom side (1) is peened locally in the region around the hole (3).

17 Claims, 1 Drawing Sheet

Figure 1:
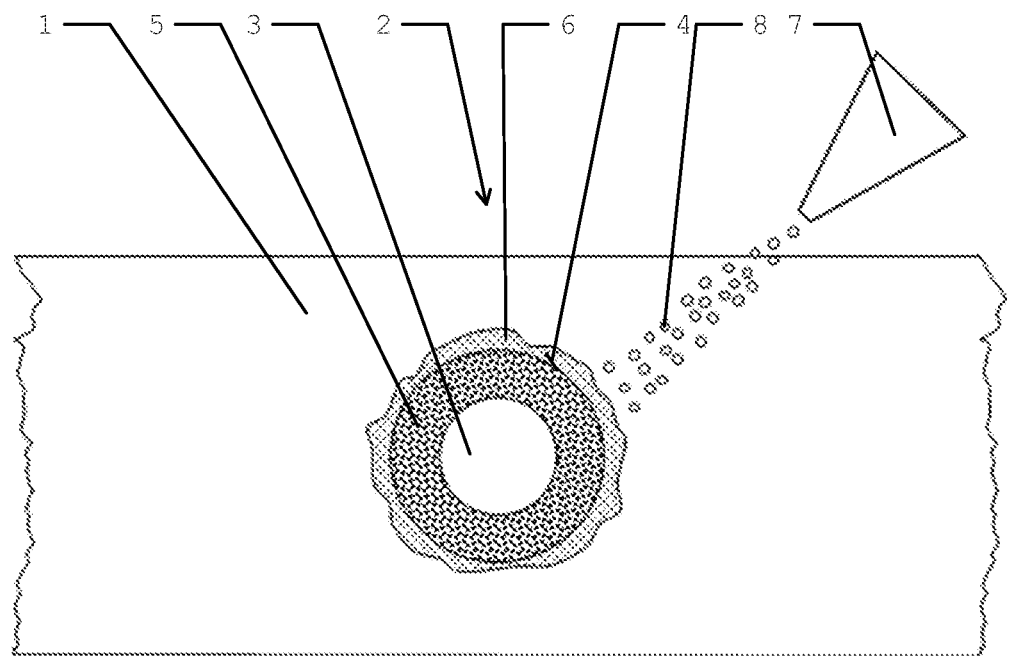

(51) Int. Cl.
*B24C 1/10* (2006.01)
*B60G 11/02* (2006.01)

(52) U.S. Cl.
CPC .... *B60G 2202/11* (2013.01); *B60G 2206/724* (2013.01); *B60G 2206/8109* (2013.01); *B60G 2206/84* (2013.01); *B60G 2206/8403* (2013.01); *F16F 2224/0208* (2013.01); *F16F 2226/02* (2013.01); *F16F 2226/04* (2013.01); *F16F 2238/022* (2013.01)

(58) Field of Classification Search
CPC ............ B60G 2200/31; B60G 2202/11; B60G 2202/112; B60G 2204/121; B60G 2206/84; B60G 2206/91; B60G 2206/724; B60G 2206/8109; B60G 2206/8403
USPC .......................................................... 267/47
See application file for complete search history.

(56) References Cited

U.S. PATENT DOCUMENTS 6,056,276 A * 5/2000 Muzio .................. F16F 1/20
267/148
2005/0028902 A1 * 2/2005 Akeda ...................... C21D 7/06
148/580
2016/0361746 A1 12/2016 Maeguchi et al.
2017/0313149 A1 * 11/2017 Chihara .................... C21D 9/02

FOREIGN PATENT DOCUMENTS

| | | |
|---|---|---|
| DE | 202011001703 U1 | 4/2012 |
| EP | 3222872 A1 | 9/2017 |
| GB | 542043 | 12/1941 |
| GB | 576388 | 4/1946 |
| GB | 992882 A | 5/1965 |
| WO | 2011077985 A1 | 6/2011 |
| WO | 2015098172 A1 | 7/2015 |

OTHER PUBLICATIONS

Hui; et al., "Mechanical Spring Manufacturing Technology", China Machine Press, Sep. 1987, p. 303 (No English translation available).
Dongwen, "Practical Manual of New Technology and Quality Control for Spring Design and Manufacturing Process", p. 680 with English translation, Aug. 31, 2003.
Search Report Issued by the Austrian Patent Office for Application No. A 50876/2017, dated Jul. 12, 2018 (3 pages).
International Search Report and Written Opinion for International Application No. PCT/EP2018/078224, dated Aug. 13, 2018 with English Translation (18 pages).

* cited by examiner

SPRING LEAF AND METHOD FOR PRODUCING A SPRING LEAF

CROSS-REFERENCE TO RELATED APPLICATIONS

The present application is a U.S. national stage application of International Patent Application No. PCT/EP2018/078224, filed Oct. 16, 2018, which claims the benefit of Austrian Patent Application No. A 50876/2017, filed Oct. 16, 2017, both of which are incorporated by reference herein in their entireties.

The invention relates to a method for producing a spring leaf for a leaf spring, in particular a parabolic spring or a suspension spring, wherein the spring leaf has two end regions, a central region, a top side which is subjected to tensile stress in the operative state, and a bottom side which is subjected to pressure in the operative state, and wherein at least one hole is introduced into the bottom side.

In addition, the invention relates to a spring leaf for a leaf spring, in particular a parabolic spring or a suspension spring, wherein the spring leaf has two end regions, a central region, a top side which is subjected to tensile stress in the operative state and a bottom side which is subjected to pressure in the operative state, and wherein the bottom side has at least one hole.

Leaf springs are used for wheel suspensions in motor vehicles, in particular in commercial vehicles or trailers (towed vehicle). The requirements of the motor vehicles are characterized on the one hand by the reduction of the weight of individual components. On the other hand, the requirements are characterized in that individual components are subjected to increasingly high mechanical stresses, for example on account of increasing engine outputs.

Many different forms of leaf springs, for example parabolic springs or suspension springs or trapezoidal springs, are known from the prior art. Such leaf springs consist of a single spring leaf or several spring leaves, wherein each spring leaf has two end sections and a middle section located therebetween. In the middle section, a clamping area is provided in which the leaf spring is connected to a wheel axle or a wheel axle bolt of a vehicle by way of a connecting device, in particular via one or more U-shaped bolts or shaped parts enclosing the leaf spring in the clamping area.

If a leaf spring has a plurality of spring leaves arranged one above the other, the spring leaves are often connected to one another in the clamping region, in particular by means of a bolt which is guided through a central through-hole (hereinafter referred to as the central hole) in the clamping region of each spring leaf, wherein the spring leaves either rest directly against each other or intermediate elements, such as intermediate plates, are arranged or clamped between the spring leaves.

As a rule, multi-leaf springs have a base spring leaf, which can also be referred to as a guide spring leaf, and further spring leaves arranged thereon. In at least one end section of the basic spring leaf, through-holes can be provided, through which connecting means for connecting the leaf spring to vehicle parts, in particular to an axle, can be guided.

Spring leaves of multi-leaf springs can have further through-holes and/or blind holes on their bottom side. Single-leaf springs can also comprise through-holes, e.g. through-holes provided in at least one end section, by means of which the connecting means for connecting the leaf spring to vehicle parts, in particular to an axle, can be guided, and/or blind holes on their bottom side.

A known problem with leaf springs is that spring leaves can break with increasing mechanical stress in areas where they have a hole. In this regard, the problem of central hole fractures has to be considered in particular.

Central hole fractures represent a generally known and undesirable fracture behaviour in leaf springs. In most instances, the central hole fractures originate from the bottom side of a spring leaf which is subjected to pressure during the operative state. Central hole fractures can be caused in the operative state both by static loading of the leaf spring, i.e. in the rest state of a vehicle, or by dynamic loading of the leaf spring, i.e. during driving.

The cause of central hole fractures has not been clearly ascertained so far. In practice, hydrogen-assisted cracking (HAC) was generally assumed to be the cause of central hole fractures.

In order to prevent central hole fractures, it is known from CA 2 865 630 A1 to avoid hydrogen-assisted cracking by locally heating the spring leaf and then rapidly cooling it. This process is disadvantageous because it is complicated in terms of process technology and the heating and cooling process requires high and expensive energy expenditure. Moreover, the heating can take place only before shot peening of the spring leaf top side, since after the shot peening no heating of the spring leaf is to take place since the heating per se has a negative effect on the surface texture of the spring leaf.

In order to avoid central hole fractures, it is also known to chamfer the edges of the central hole on the bottom side of the spring leaf and to arrange a relatively soft steel intermediate layer (in relation to the material of the spring blade) between the spring leaves and the top side of the spring leaf. A relatively soft washer is placed on the bottom side of the spring leaf. These process steps are also costly in terms of processing technology, wherein the additional material expenditure causes further costs and, in principle, increases the weight of the finished leaf spring. In addition, central hole fractures also occur in the area of the chamfer.

The invention is based on the object of providing a spring leaf for a leaf spring with which the risk of a hole fracture, in particular the risk of a central hole fracture, is reduced while avoiding the disadvantages of the prior art.

In the production of spring leaves, forming processes, in particular rolling operations, take place in order to bring the spring leaf into the desired shape. It is known in this context that the spring leaves are tempered on their top side, which is subjected to tensile stress when in the operative state, after the rolling processes, and are further processed, in particular by shot peening or stress peening, to optimise the tension distribution. The bottom side, which is subjected to pressure in the operative state, is generally not peened, but remains in the material state which it has after the rolling processes and the tempering.

Surprisingly, it has now been found that the cause of the central hole fractures can be that tensile stresses are produced on the side of the spring leaf which is subjected to pressure in the operative state by the stress peening of the side of the spring leaf which is subjected to tension in the operative state. The tensile stresses are present after the stress peening on the side of the spring leaf which is subjected to pressure in the operative state, i.e. after the spring is relieved again. This cause was not yet known.

Due to the fact that the top side of the spring leaf, but not the bottom side, is further processed, in particular stress-peened, after the rolling processes in order to optimise the tension distribution, tensile stresses can remain on the bottom side in this material state.

The realisation that these tensile stresses are present and can be responsible for the occurrence of central hole fractures is new.

In this state of material, increases in tension can occur in the operative state of the leaf spring at the edges of the holes. If, for example, a multi-leaf spring is screwed, a force transmission and thus a tension transfer from the bolt head to the bottom side of a spring leaf takes place. Furthermore, the surface tension can be superimposed by installing a leaf spring into a wheel suspension of a vehicle by applying external tensions via a convex or concave spring leaf surface. In addition, process instabilities during the production of spring leaves can have further negative effects. As a result of the above-mentioned negative effects, the risk of a central hole fracture is increased because of the presence of tensile stresses on the side of the spring leaf which is under pressure in the operational state.

In addition, tensile stresses in areas near the surface can support hydrogen-assisted cracking (HAC), which in turn increases the risk of a central hole fracture.

The invention makes use of this new finding, since according to the invention it is provided that the bottom side of the spring leaf is or will be peened around the hole. Thus, slight compressive stresses can be produced which superimpose the tensile stresses surprisingly identified as the cause of the central hole fractures and increase the local operational lifespan of the spring leaf. As a result, the risk of a hole fracture is greatly reduced, wherein the process technology expenditure as well as the energy and production costs are not appreciably increased during the production of the spring leaf and no additional components which cause further costs and represent an additional weight have to be installed.

Particularly advantageously, hydrogen-assisted cracking is also avoided, wherein, in contrast to the method according to CA 2 865 630 A1, no tensile stresses are present anymore on the bottom side of the spring leaf.

Such a spring is produced from a profile bar. The profile bar is cut to length, heated and subjected to forming processes, in particular rolling and punching processes, so that it is brought into the desired form of a spring leaf. After forming, hardening and tempering measures are carried out. While the profile bar is being formed, a semi-finished product is in itself present. It is only when all the machining steps, i.e. the hardening and tempering measures that take place after the forming processes, are completed that there is a finished spring leaf as a finished product.

Within the scope of the invention, however, a spring leaf is already referred to during the forming processes. It is thus intended to make clear that the introduction of the hole/holes into the bottom side and the peening of the bottom side in the region of the hole/holes are method steps for forming features relating to the spring leaf which is present as a finished product after completion of all processing steps.

Within the scope of the invention, it is possible to peen the entire bottom side of the leaf spring or at least a large part thereof. However, since this causes certain process costs and has a negative influence on the capacity of the peening system, it is provided in a particularly preferred embodiment that the bottom side will be or is peened locally around the hole. This means that the bottom side will be or is peened only in the region around the corresponding hole, whereas in regions in which no hole is provided there will be or is no peening. In a further preferred embodiment of the invention it can be provided that the bottom side in the area around the hole will be or is shot-peened.

For example, peening agents having a grain diameter of 0.4 to 1.2 mm can be used. It is particularly economical when already used peening media is reused, for example peening media used for peening the top side of the spring leaf.

Within the scope of the invention, a peening agent can be applied via a jet nozzle, wherein the jet nozzle and the region of the hole are aligned with one another. For this purpose, provision can be made for the nozzle to be moved towards the spring leaf and/or the spring leaf towards the nozzle.

For example, a robot can turn the spring leaf in an automatic peening system and hold it with the corresponding hole in the bottom side for a few seconds to the jet nozzle. In the case of a hand-held peening machine, the spring leaf can be placed on a conveyor belt after peening of the top side. The conveyor belt then moves the spring leaf over a jet nozzle.

In the context of the invention, it is preferred for a region to be peened around the hole so that the distance from the hole to the transition between the peened and non-peened surface of the bottom side is in the range of approximately 5 cm or 4 cm or 3 cm or 2 cm or 1 cm.

It goes without saying that there is no smooth boundary between peened and non-peened area during peening. Rather, the transition from the non-peened and the peened region takes place gradually in a certain scattering range.

A through-hole or a blind hole can be introduced as a hole within the scope of the invention. Multiple holes may be provided, wherein any combination of through-holes or blind holes is conceivable.

If a blind hole is provided on the bottom side of a spring leaf, then it is clear that this blind hole is introduced into the spring leaf from the bottom side. In the context of the invention, a through-hole can be introduced into the spring leaf from the bottom side or from the top side of the spring leaf. It is important that a hole is introduced into the bottom side of the spring leaf. In a particularly preferred embodiment of the invention it can be provided that a clamping region with a continuous central hole will be or is formed in the central region and that the region will be or is peened around the central hole.

Within the scope of the invention it is provided that the spring leaf consists of flat bar steel, in particular spring steel.

A particularly preferred embodiment of the invention can be represented as follows:

The spring leaf is hot-deformed, in particular rolled, and then tempered by peening the top side of the spring leaf, in particular under pretensioning the spring leaf. The bottom side of the spring leaf is peened in the area around the hole after the peening of the top side of the spring leaf, in particular after the peening of the top side of the spring leaf under pretensioning. The bottom side of the spring leaf can take place in the area around the hole directly after the peening of the top side of the spring leaf, or further processes can take place between the peening of the top side and the peening of the bottom side.

Figure 2:
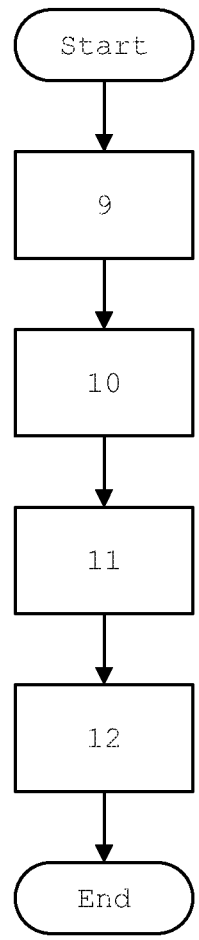

The drawings show as follows:

FIG. 1 shows a region of a bottom side of a spring leaf in the region of a hole, and FIG. 2 shows a block diagram with an embodiment of a method sequence according to the invention.

In FIG. 1 a region of a bottom side 1 of a spring leaf 2 for a leaf spring is shown in which a hole 3 is introduced. The leaf spring may, for example, be a parabolic spring or a suspension spring. The hole 3 can be a through-hole or a blind hole. The hole 3 can be a central hole provided in a clamping area or in another area of the spring 2 leaf, for example in an end area.

The bottom side 1 of the spring leaf 2 is subjected to pressure in the operative state of the leaf spring.

The spring leaf 2 is preferably made of flat bar steel, in particular spring steel. The bottom side 1 of the spring leaf 2 is peened locally in the region around the hole 3, in particular shot-peened. The distance from the hole 3 to the transition 4 between the peened and non-peened surface of the bottom side 1 is in the range of a few centimetres. During peening, a first region 5, which is uniformly peened, is formed around the hole, as well as a second region 6 adjacent thereto, in which the transition from the non-peened and peened region takes place gradually in a certain scattering region.

The peening can take place via a jet nozzle 7 which applies a peening agent 8 to the bottom side 1, wherein the jet nozzle 7 and the region of the hole 3 are aligned with one another.

FIG. 2 shows an exemplary process sequence for producing a spring leaf 2 according to the invention in a block diagram, wherein individual blocks provided with reference numerals can consist of single or multiple process steps.

In block 9, for example, a profile bar can be cut to a desired length and heated.

In block 10, heat processing and heat-forming processes can be carried out. In particular, the heated profile bar can be rolled and, if necessary, further cut to size, wherein at least one hole 3 is introduced into the bottom side 1 of the spring leaf 2 to be produced. In block 10, in particular, a central hole can be introduced into the clamping area. Alternatively or additionally, at least one longitudinal end of the spring leaf 2 can be machined in that at least one end section is formed into a means for connecting the spring leaf to a vehicle chassis or to connecting parts of a wheel suspension, in particular into a spring eye. Likewise, an embodiment is conceivable in which at least one end section is converted into a securing means, such as a safety wraparound.

In block 11 further mechanical machining can take place. Processes for bending, tempering, hardening and annealing the spring leaf 2 may take place. Likewise, the top side of the spring leaf 2 can be peened, in particular peened under the pretensioning of the spring leaf 2.

Blocks 9 to 11 comprise method steps known from the prior art.

In block 12, the method step proposed according to the invention takes place, in which the bottom side 1 is peened in the region around the hole 3, in particular locally peened, preferably shot-peened.

After the block 12, further processes can take place up to the completion of a leaf spring, wherein the leaf spring can have one spring leaf 2 or two or more spring leaves 2.

If a spring eye has been rolled, an eye bearing can be pressed in, for example. For example, the spring 2 can be painted. The leaf spring can be set, tested and packaged.

The peening of the bottom side of the spring leaf 2 described in block 12 can take place immediately after the stress peening of the top side of the spring leaf 2 or further processes can take place between the peening of the top side and the peening of the bottom side, for example setting.

The invention claimed is:

1. A method for producing a spring leaf for a leaf spring, wherein the spring leaf has two end regions, a central region, a top side which is subjected to tension in the operative state, and a bottom side which is subjected to pressure in the operative state, wherein the spring leaf is hot-deformed and rolled, wherein at least one hole is introduced into the bottom side, wherein the top side is peened under pretensioning of the spring leaf producing tensile stresses on the bottom side, and after peening of the top side, the bottom side is peened locally and only in the region around the at least one hole producing compressive stresses superimposing the tensile stresses.

2. A method according to claim 1, wherein the bottom side is shot-peened in the region around the hole.

3. A method according to claim 1 wherein a peening medium is applied via a jet nozzle, wherein the jet nozzle and the region of the hole are aligned with one another.

4. A method according to claim 3, wherein the jet nozzle is moved towards the spring leaf and/or the spring leaf is moved towards the jet nozzle.

5. A method according to claim 1 wherein a region around the hole is peened, so that the distance from the hole to the transition between the peened and non-peened surface of the bottom side lies in the range from 5 cm to 1 cm.

6. A method according to claim 1 wherein the at least one hole is a through-hole or a blind hole.

7. A method according to claim 6, wherein the at least one hole is a continuous central hole formed in a clamping region of the central region, and the bottom side is peened locally in the region around the central hole after the peening of the top side.

8. A method according to claim 1 wherein the spring is produced from flat bar steel comprising spring steel.

9. A method according to claim 1 wherein the spring leaf is hardened and tempered after rolling but before peening of the bottom side.

10. A method according to claim 1, wherein the leaf spring is a parabolic spring or a suspension spring.

11. A spring leaf for a leaf spring, wherein the spring leaf comprises two end regions, a central region, a top side which is subjected to tension in the operative state, a bottom side which is subjected to pressure in the operative state, and wherein the bottom side has at least one hole, wherein the spring leaf is hot-deformed and rolled wherein the top side is peened under pretensioning of the spring leaf producing tensile stresses on the bottom side, and after peening of the top side, the bottom side is peened locally and only in the region around the at least one hole producing compressive stresses superimposing the tensile stresses.

12. A spring leaf according to claim 11, wherein the bottom side is shot-peened in the region around the hole.

13. A spring leaf according to claim 11 wherein the distance from the hole to the transition between the peened and non-peened surface of the bottom side lies in the range of from 5 cm to 1 cm.

14. A spring leaf according to claim 11 wherein the hole is a through-hole or a blind hole.

15. A spring leaf according to claim 14, wherein a clamping region with a continuous central hole is provided in the central region, and that the region is peened around the central hole.

16. A spring leaf according to claim 11 made of flat bar steel, said flat bar steel being spring steel.

17. A leaf spring according to claim 11, wherein the leaf spring is a parabolic spring or a suspension spring.

\* \* \* \* \*